United States Patent
Monrad et al.

(10) Patent No.: US 6,208,628 B1
(45) Date of Patent: Mar. 27, 2001

(54) METHOD FOR PROVIDING A UNIQUE TEMPORARY IDENTIFICATION OF A MOBILE STATION

(75) Inventors: Atle Monrad, Froland; Ole Jonny Gangsøy, Arendal, both of (NO)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/007,065

(22) Filed: Jan. 14, 1998

(30) Foreign Application Priority Data

Jan. 15, 1997 (NO) ........................................... 970181

(51) Int. Cl.⁷ ....................................................... H04Q 7/00
(52) U.S. Cl. ........................... 370/328; 455/432; 455/435
(58) Field of Search ................................. 370/328, 338, 370/349, 401, 475; 455/432, 433, 434, 435, 428, 430

(56) References Cited

U.S. PATENT DOCUMENTS

| | | | |
|---|---|---|---|
| 5,375,251 | * 12/1994 | Pfundstein | 455/551 |
| 5,675,628 | * 10/1997 | Hokkanen . | |
| 5,873,034 | * 2/1999 | Alperovich et al. | 455/432 |
| 5,920,814 | * 7/1999 | Sawyer et al. | 455/422 |
| 6,006,094 | * 12/1999 | Lee | 455/445 |

FOREIGN PATENT DOCUMENTS

| | | |
|---|---|---|
| 0530010 | 3/1993 | (EP) . |
| 0711088 | 5/1996 | (EP) . |
| 94/19891 | 9/1994 | (WO) . |
| 96/04759 | 2/1996 | (WO) . |
| 96/21983 | 7/1996 | (WO) . |

OTHER PUBLICATIONS

ETSI: "European Digital Cellular Telecommunications System (Phase 2); Mobile Application Part (MAP) Specification", GSM 09.02 Dec. 1995.
ETSI: "Release Note—Recommendation GSM 03.12—Location Registration Procedures", Feb. 1992.

* cited by examiner

Primary Examiner—David R. Vincent
(74) Attorney, Agent, or Firm—Burns, Doane, Swecker & Mathis, L.L.P.

(57) ABSTRACT

The present invention relates to a method for providing a unique temporary international identification of a mobile station during establishment and re-establishment of a logical link between a mobile station and the associated serving GPRS (General Packet Radio Service) support node (SGSN). The unique temporary international identification allows international roaming across country borders without using the international mobile station identification (IMSI), i.e. beyond the coverage area of the home PLMN, it is according to the present invention suggested to form new identity comprising the old TLLI, the old RA, and identification of the public land mobile network (PLMN) that is the owner of the old TLLI and the country where the PLMN belong. The new identity is used as identification on the radio interface, identification within the current SGSN and for identification of the old SGSN.

12 Claims, 1 Drawing Sheet

........... Signalling Interface
─────── Signalling and Data Transfer Interface

METHOD FOR PROVIDING A UNIQUE TEMPORARY IDENTIFICATION OF A MOBILE STATION

FIELD OF THE INVENTION

The present invention relates to a method for providing a unique identification of a mobile station, especially during an initial procedure for initiating and re-establishing a link between a mobile station and the associated serving GPRS (General Packet Radio Service) support node (SGSN).

BACKGROUND OF THE INVENTION

GPRS (General Packet Radio Service) that is currently being specified by ETSI (The European Telecommunication Standards Institute) as a service for GSM phase 2+, provides packet switched connections throughout the PLMN (Public Land Mobile Network). The packet switching is performed between the nodes in the network and on the radio interface. Packet traffic may exist between external data networks and mobile stations and between mobile stations. As in other mobile telephone systems, the mobile stations have radio access to the system with a minimum of consideration of how networks are built and which operators that owns them. They may be connected to an operator anywhere in the home country or somewhere abroad and switch country or operator according to their own needs or decisions.

To provide an efficient transfer of packets between the end users (payload) and also for control signalling between the network elements in the PLMN and the mobile station, layered protocols are used. Each layer or control function has its dedicated functions. Identification of a particular subscriber, either for transfer of payload or for control signalling, is normally done by an identification element that e.g. is a part of the header field in each packet or the first packet in case of segmented packets.

The architecture of GPRS is shown in FIG. 1.

The protocol stack for GPRS is sketched in FIG. 2.

STATE OF THE ART

The specification for GPRS (attached ETSI spec 03.60 rev 0.20.0) indicates that when a mobile station makes itself available to the PLMN as a result of an automatic or a manual procedure (an attach procedure), the old TLLI (Temporary Logical Link Identifier) will be used as identifier on the radio interface for initial signalling procedures and in the SGSN in order to identify the mobile station and connect it to the IMSI (International Mobile Station Identity), the subscribers unique identity within GSM. When the unique identity is found, information related to the subscription can be found and it can be verified that the mobile station in question is not a fraud. In case this attach procedure is performed in the coverage area of another SGSN than the one where the mobile station performed the last detach procedure, the old TLLI and the old RA (Routing Area) is used to identify the former SGSN in order to fetch the IMSI.

Further, in the specifications, it is indicated that if the system discovers better conditions on cells belonging to a different SGSN than the one where a logical link exists (an inter SGSN routing update procedure), the old TLLI and the old RA will be used as identifiers on the radio interface for initial signalling and to identify the former SGSN in order to find the subscriber's identity (IMSI).

When a mobile station is identified, authentication is performed and relevant subscription data is signalled to the SGSN, a new TLLI is assigned to the mobile station. This TLLI is then used for further signalling within the coverage area of the SGSN. If an attach procedure is initiated within the same SGSN service area as the one where the mobile station performed detach, a change of TLLI is not necessary if the old TLLI is sufficient to identify the mobile station.

The RA is a logical part of the coverage area of an SGSN. According to the specifications, the TLLI can never be uniquely identified in a larger service area than an SGSN.

To use the IMSI as an identifier in this initial procedure is only a recommended solution if other identities cannot be used. This is in order to ensure the largest possible user confidentiality.

PROBLEMS RELATED TO PRIOR ART

As mobile stations may register to the system at unpredictable points, move around within or across country borders or change operator at will, unique identification of a subscriber within the GSM system is necessary in order to provide international roaming. This is not possible by using old TLLI or old TLLI in combination with old RA. This combination will only be able to uniquely identify subscribers within the coverage area of its home PLMN.

OBJECTS OF THE INVENTION

The main object of the present invention is to provide a unique temporary identification for mobile stations in GPRS.

Another object of the invention is to provide a unique identification of a mobile station during the initial procedures to initiate (attach procedure) or to re-establish a link (inter routing area update procedure) between a mobile station and the associated SGSN.

SUMMARY OF THE INVENTION

The above objects are achieved in a method as stated in the preamble, which according to the present invention is characterized by forming a new identity comprising the old temporary logical link identifier (TLLI), the old routing area (RA), an identification of the public land mobile network (PLMN) that is the owner of the old TLLI and the country where the PLMN belong, the new identity being used as identification on the radio interface.

More specifically this unique new identity can be used as an international link set-up identity (ILSI).

Further features and advantages related to the present invention will appear from the following description taken in connection with the attached drawings, as well as from the appending patent claims.

BRIEF DISCLOSURE OF THE DRAWINGS

DETAILED DESCRIPTION OF EMBODIMENTS

Figure 1:
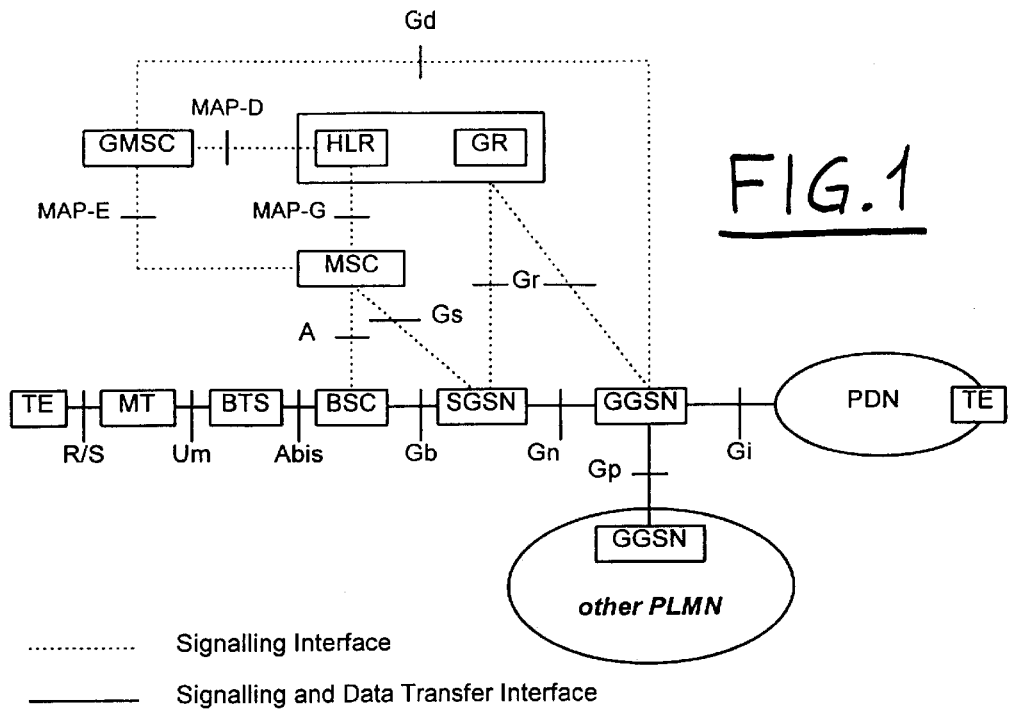
FIG. 1 is a schematic diagram illustrating the general architecture of GPRS, and more specifically the related signalling interface and the signalling and data transfer interface.
Figure 2:
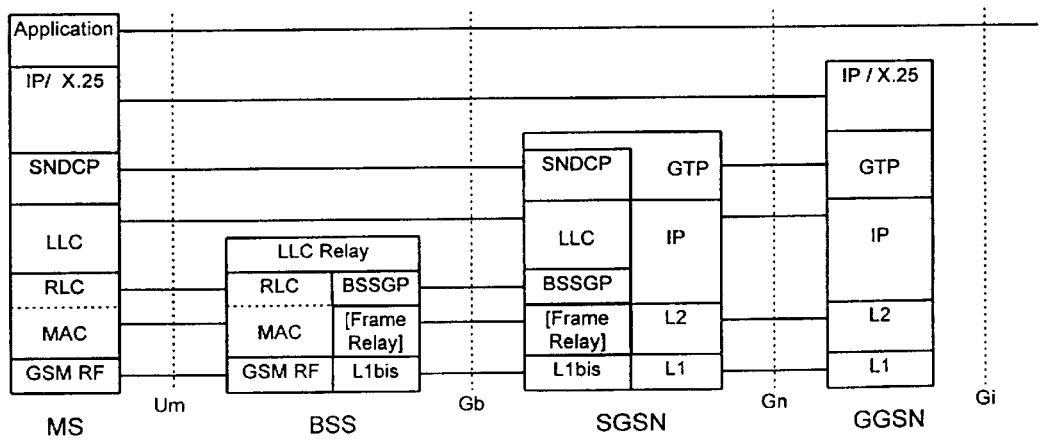
FIG. 2 is a sketch illustrating the protocol stack for GRPS as illustrated in FIG. 1.

As previously stated under the headings "State of the Art" and "Problems Related to the State of Art", the present invention will in relation to such a system as disclosed in connection with FIGS. 1 and 2, provide a method wherein international roaming may be performed while still retaining a unique temporary international identification of a mobile station in question.

As a result of this unique temporary international identification it will be possible to reduce the traffic cases wherein the international mobile station identity (IMSI) is signalled on the radio interface.

In other words, to get a unique temporary identification of a mobile station during the initial procedures to initiate (attach procedure) or to re-establish a link (inter routing area update procedure) between the mobile station and the SGSN, the following solution is outlined.

An identification of the PLMN that is the owner of the old TLLI and the country where the PLMN belong must be used as an identification on the radio interface together with the old RA and the old TLLI. This forms a new identity that may be called ILSI (International Link Set-up Identity). By using this information in the attach sequence and in the inter routing area update sequence, a unique temporary international identification of a mobile station is ensured. The ILSI can be used as an identification on the radio interface and for addressing in the new SGSN in order to address the old SGSN and hereby get the IMSI available in the new SGSN.

This mechanism can be expected to lead to that each PLMN has its own handling of the actual TLLI values. As an addition to the ILSI or as an alternative to handling international TLLIs, a server can be introduced to ease this handling. This TLLI or ILSI distributor, named ITIS (International Temporary Identification Server) can be used to centralize the handling and assignment of the logical link identification.

Consequently, the invention makes it possible to have a unique temporary international identification of a mobile station. The invention further reduces the traffic cases where the IMSI is signalled on the radio interface.

In brief, the present invention provides a unique temporary international identification for GPRS, namely an ILSI, providing initial identification on the radio interface.

This unique temporary international identification can be available to the lower layers in the SGSN.

Further, the unique temporary international identification can be used to get the IMSI of the mobile station known to the new SGSN without signalling the IMSI over the radio interface.

Finally, a new server (ITIS) can be used to ensure unique assignment of ILSI and TLLI within the GSM GPRS network.

What is claimed is:

1. Method for providing a unique temporary international identification of a mobile station, especially during an initial procedure for initiating and re-establishing a link between a mobile station and an associated serving GPRS (General Packet Radio Service) support node (SGSN), comprising the steps of: forming a unique new identity comprising an old TLLI (Temporary Logical Link Identifier), an old RA (Routing Area), an identification of a public land mobile network (PLMN) that is the owner of said old TLLI and the country where said PLMN belongs, said unique new identity being used as identification on a radio interface.

2. Method as claimed in claim 1, wherein said unique new identity is used as an international link set-up identity (ILSI).

3. Method as claimed in claim 1, wherein said unique identification information is used in an attach sequence and in an inter routing area update sequence, thereby ensuring a unique temporary international identification of a mobile station.

4. Method as claimed in claim 1, wherein a international link set-up identity (ILSI) is used as an identification on the radio interface and for addressing in a new SGSN in order to address an old SGSN and thereby get an IMSI (International Mobile Station Identity) available to said new SGSN.

5. Method as claimed in claim 1, characterized in that each PLMN is assigned its own handling of any actual TLLI value.

6. Method as claimed in claim 1, characterized in that a server is introduced as an addition to a ILSI or as an alternative to handling any international TLLI.

7. Method as claimed in claim 1, characterized by using an international temporary identification server (ITIS) for handling and TLLIL or ILSI, possibly for centralizing the handling and assignment of the logic link identification.

8. Method as claimed in claim 1, characterized by using an unique temporary international identification that is available to the lower layers in the SGSN.

9. Method as claimed in claim 1, characterized in that said unique temporary international identification can be used to get the IMSI of the mobile station known to the new SGSN without signalling the IMSI over the radio interface.

10. Method as claimed in claim 1 wherein said Serving GPRS Support Node (SGSN) decides whether said old TLLI is invalid, and if said old TLLI is determined invalid, said SGSN initiates an update of said old TLLI without transmission of an IMSI (International Mobile Station Identity) by the mobile station.

11. A method for providing a unique temporary international identification for a mobile station comprising the steps of:

forming said unique temporary international identification using:
(a) a temporary logical link identifier (TLLI);
(b) a routing area parameter;
(c) a public land mobile network (PLMN) identifier; and
(d) a country associated with said PLMN.

12. The method of claim 11, further comprising the steps of: forming said unique temporary international identification without using an international mobile station identity (IMSI) transmitted over an air interface.

* * * * *